(12) United States Patent
Huang et al.

(10) Patent No.: US 7,825,607 B1
(45) Date of Patent: Nov. 2, 2010

(54) D-C TO D-C CONVERTER CIRCUIT

(76) Inventors: Zhen Qiu Huang, 768 S. Turnbull Canyon Rd., City of Industry, CA (US) 91745; Guang Xiong Huang, 768 S. Turnbull Canyon Rd., City of Industry, CA (US) 91745

(*) Notice: Subject to any disclaimer, the term of this patent is extended or adjusted under 35 U.S.C. 154(b) by 532 days.

(21) Appl. No.: 11/986,523

(22) Filed: Nov. 23, 2007

(51) Int. Cl.
*H05B 41/16* (2006.01)

(52) U.S. Cl. .......................... 315/247; 315/82; 315/307

(58) Field of Classification Search .................... 315/77, 315/82, 209 R, 210, 246, 247, 287, 291, 297, 315/307, 308; 307/10.1, 10.8; 323/207, 323/282; 363/15, 21.03, 21.04, 21.09, 34, 363/123, 140
See application file for complete search history.

(56) References Cited

U.S. PATENT DOCUMENTS

| | | | | |
|---|---|---|---|---|
| 4,841,198 A | * | 6/1989 | Wilhelm | 315/82 |
| 7,593,241 B2 | * | 9/2009 | Kwon et al. | 363/16 |
| 2003/0102819 A1 | * | 6/2003 | Min et al. | 315/291 |
| 2007/0229001 A1 | * | 10/2007 | McIntosh et al. | 315/307 |
| 2008/0130328 A1 | * | 6/2008 | Choi | 363/25 |

* cited by examiner

*Primary Examiner*—Douglas W Owens
*Assistant Examiner*—Tung X Le
(74) *Attorney, Agent, or Firm*—Albert O. Cota

(57) ABSTRACT

A d-c to d-c converter circuit (DDCC) (10) that is comprised of a passive thin-film hybrid circuit that includes an input circuit (12), a voltage regulator circuit (14), a comparator circuit (16), an oscillator circuit (18) and an output circuit (20). The input circuit (12) is applied an input d-c voltage (11) from the vehicle's battery circuit (50). The input voltage (11) is converted by the DDCC (10) into an output d-c voltage (23) that is suitable to operate a set of LED tail lamps and/or a set of LED turn-signal lamps. The DDCC (10) is designed to replace a prior art heat-producing, voltage dropping resistive element (Rx) that drops the battery voltage to a suitable level to operate the LEDs. Additionally, the DDCC (10) is easily spliced into the vehicle's electrical wiring cable (54), requires a small mounting space and produces no significant heat.

18 Claims, 4 Drawing Sheets

D-C TO D-C CONVERTER CIRCUIT

TECHNICAL FIELD

The invention generally pertains to d-c to d-c converters and more particularly to a d-c to d-c converter circuit that supplies a high-frequency chopped square wave that operates a vehicle LED circuit such as a pair of LED vehicle tail-lamps and/or a pair of vehicle turn-signal lamps.

BACKGROUND ART

In current vehicle designs, which includes both automobiles and trucks, the use of LEDs is preferred for illuminating tail-lamps and turn-signal lamps rather than conventional filament lamps. LEDs require a small mounting area, are bright, have a high reliability and a relatively long useful life.

A problem that arises in directly replacing the filament lamps with LEDs is that automobiles and most trucks utilize a 12-volt battery and many tractor trailer trucks utilize a 24-volt battery. Since LEDs operate on a d-c voltage ranging from 3.5 to 4.5 volts d-c the high-voltage filament lamps cannot be directly replaced by the low-voltage LEDs. To solve this problem the prior art attaches a voltage-dropping resistive element in series with the LEDs and the vehicle battery. This solution allows the resistive element to lower the d-c voltage from the vehicle battery to a level that is required to operate the LEDs. However, the resistive element is relatively large, is cumbersome and produces a substantial amount of heat that may cause vehicle elements surrounding the resistive element to be affected.

The inventive d-c to d-c converter circuit (DDCC) utilizes a passive electronic circuit to lower the voltage and the current to an acceptable level to operate the LEDs, and eliminates the voltage dropping resistive element and the heat it generates. Additionally, the DDCC is much smaller than the resistive element which makes it easy to incorporate into the vehicle electrical wiring cable that is connected from the vehicle battery to the vehicle tail lamps. In addition, the DDCC is universal in that it is self adjusting to the types and quantity of LED's used, as long as the total wattage drawn does not exceed the wattage level of the LEDs.

A search of the prior art did not disclose any U.S patents or industry literature that read on the claims of the instant invention.

DISCLOSURE OF THE INVENTION

The d-c to d-c converter circuit (DDCC) is comprised of a passive thin-film integrated circuit that is packaged in a relatively small integrated package. The DDCC is specifically designed to replace a large and cumbersome resistive element that is placed in series with a vehicle battery circuit and a vehicle LED circuit which typically consists of a set of vehicle tail lamps and/or a set of vehicle turn-signal lamps. The DDCC which is designed to operate with a d-c input voltage that can range from 20 volts d-c to 28 volts d-c is comprised of the following basic elements:
 a) an input circuit having means for receiving the input d-c voltage and means for producing a filtered, current limited d-c power signal,
 b) a voltage regulating circuit comprising:
   (1) a transistor having a collector connected to the current limited d-c power signal, a base and an emitter,
   (2) an integrated voltage regulator having a first input that is applied the filtered, current limited d-c power signal, a second input, a third input and an output that produces a regulated square wave signal,
 c) a comparator circuit having means for receiving a clamped d-c-reference voltage, a d-c reference voltage and producing a d-c reference voltage that is applied to the second input of the integrated voltage regulator,
 d) an oscillator circuit having means for receiving the filtered, current limited power signal and means for producing a chopped square wave signal that is applied to the third input of the integrated voltage regulator which causes the voltage regulator to apply the regulated square wave signal to the base of the transistor which enables the transistor,
 e) an output and feedback circuit having means for producing:
   (1) the d-c reference voltage that is applied to the third input of the comparator circuit, and
   (2) a d-c output voltage that is applied to and enables the vehicle LED circuit.

In view of the above disclosure, the primary object of the invention is to produce a DDCC that replaces a relatively large prior art resistive element that is located in series with a vehicle battery circuit and a vehicle LED circuit.

In addition to the primary object of the invention it is also an object of the invention to produce a DDCC that:
 is packaged in a relatively small passive thin-film integrated circuit,
 can be easily attached to a vehicle electrical wiring cable,
 has a high reliability and long useful life, and
 is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
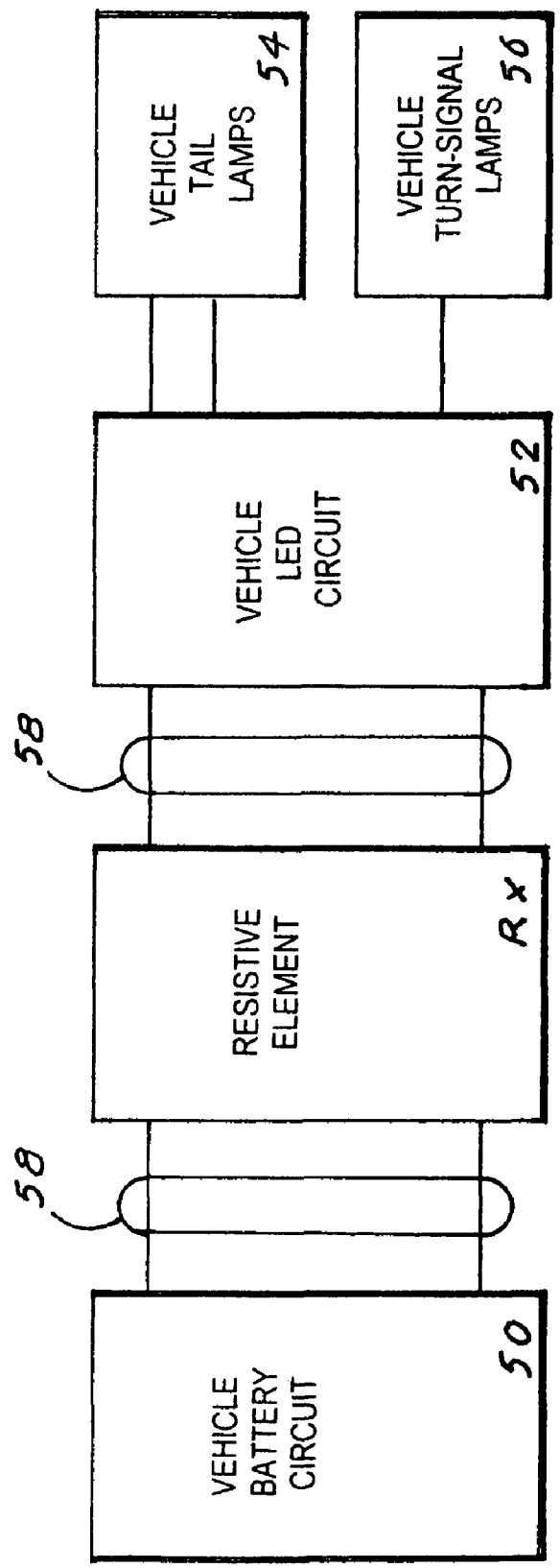
FIG. 1 is a block diagram of the prior art showing a voltage dropping resistive element that is connected in series between a vehicle battery circuit and a vehicle LED circuit.

The best mode for carrying out the invention is presented in terms of a preferred embodiment for a d-c to d-c converter circuit 10 (DDCC 10), that is used to control the operation of a set LEDs that are used to illuminate a set of vehicle tail lamps and/or a set of vehicle turn-signal lamps. The preferred embodiment of the DDCC 10, as shown in FIGS. 1-3A and 3B, is comprised of the following major elements: an input circuit 12, a voltage regulating circuit 14, a comparator circuit 16, an oscillator circuit 18 and an output and feedback circuit 20. The inventive elements function in combination with a vehicle battery circuit 50, a vehicle LED circuit 52 that operates a set of vehicle tail-lamps 54 and/or a set of vehicle turn-signal lamps 56 and a vehicle electrical wiring cable 58.

Figure 2:
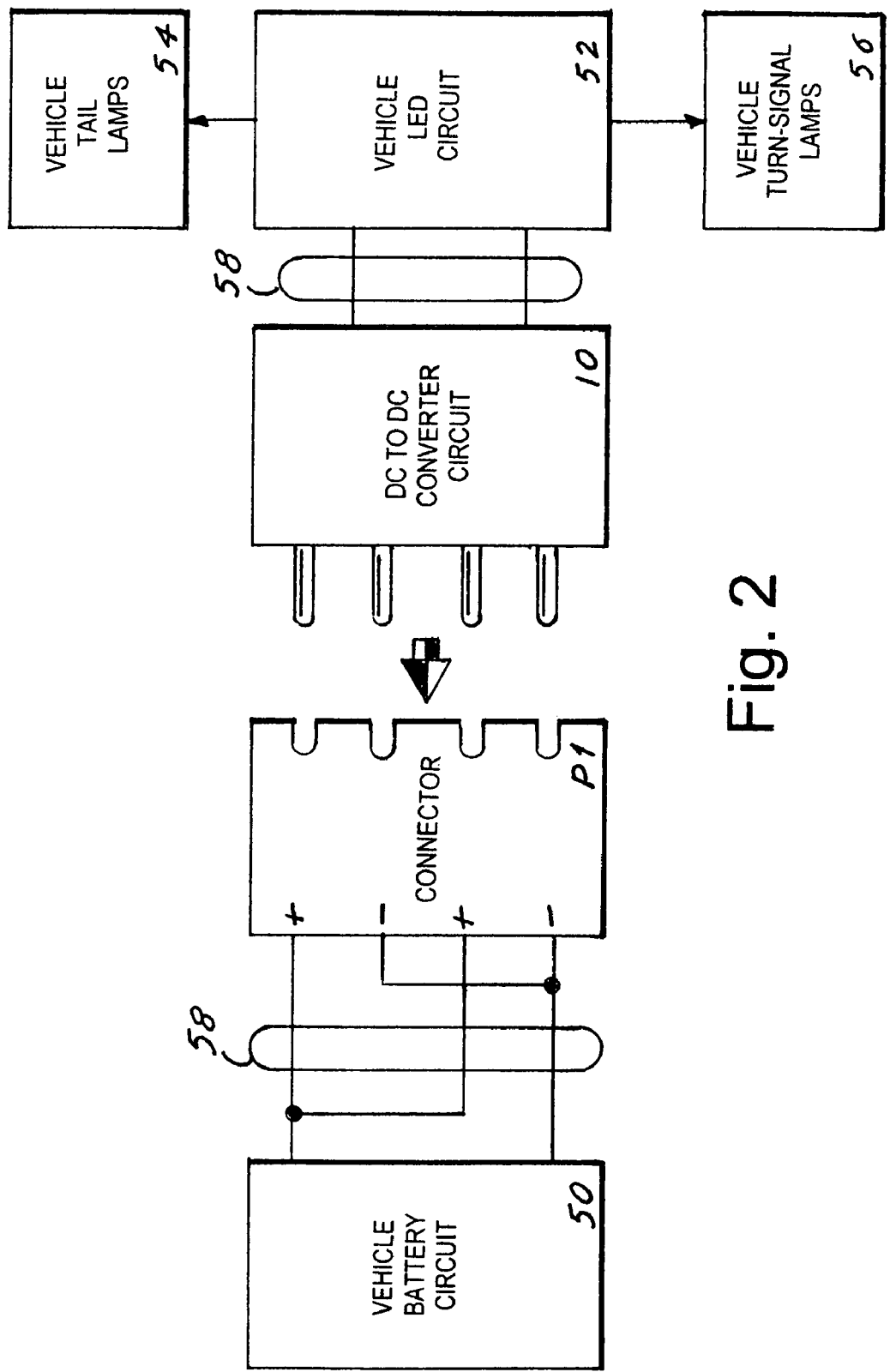
FIG. 2 is a block diagram showing the inventive d-c to d-c converter circuit inserted into a connector that is located in series between the vehicle battery circuit and the vehicle LED circuit.

The DDCC 10 is designed to replace a prior art voltage dropping resistive element (Rx), as shown in FIG. 1. The resistive element (Rx) requires a relatively large mounting space, is cumbersome and produces a significant amount of heat that can affect various vehicle elements surrounding the resistive element (Rx). In contrast, the DDCC 10 is comprised of a passive thin-film hybrid circuit having an overall length of 17 mm, a width of 13.7 mm and a thickness of 8 mm. The DDCC 10, as shown in FIG. 2, is easily spliced into the vehicle's electrical wiring cable 58, requires a small mounting space and produces no significant heat. The DDCC 10 is attached to the vehicle electrical cable 58 by means of a connector (P1) that is spliced into the cable 58 and that is configured to accept a set of four pins projecting from the DDCC 10. Alternatively, the DDCC 10 can be hard-wired directly to the cable wiring (not shown).

Figure 3A:
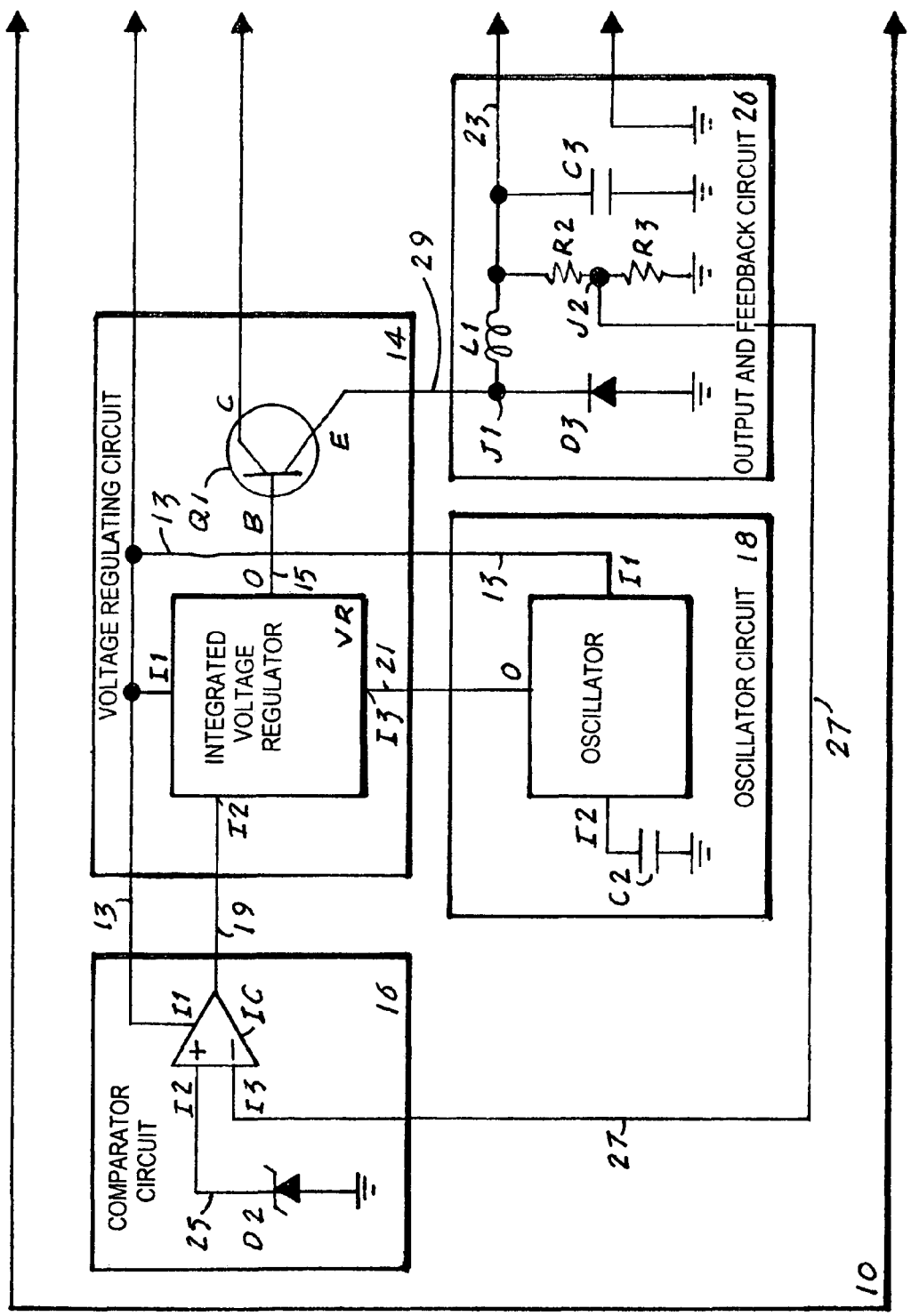
FIGS. 3A and 3B are continuous block and schematic diagrams of the d-c to d-c converter circuit.
Figure 3B:
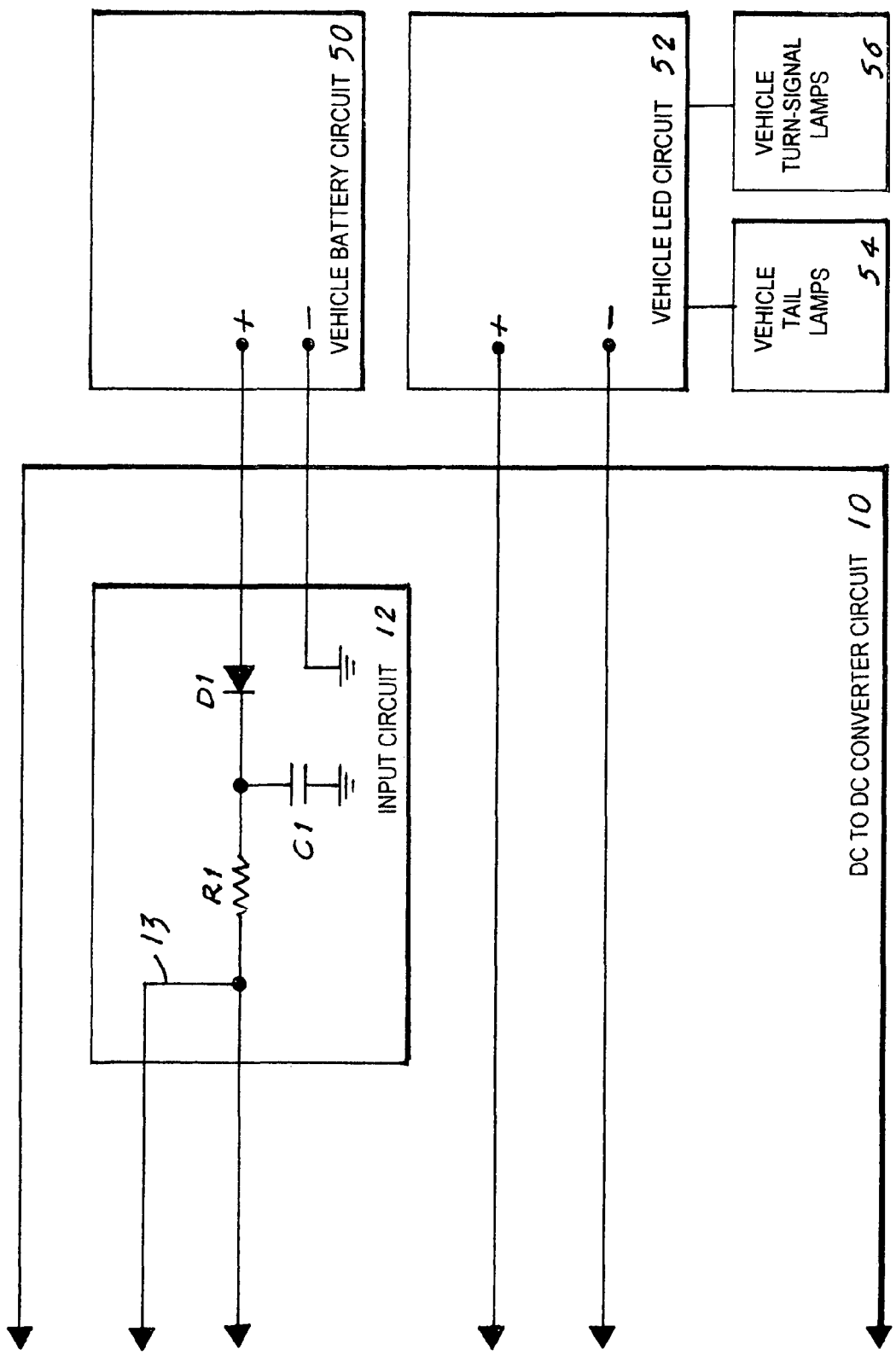

The input circuit 12, as shown in FIG. 3B, is connected to a positive d-c input voltage (11) that is applied from the vehicle battery circuit 50 and that can range from 10 volts d-c to 28 volts d-c. The input circuit 12 is comprised of a diode (D1), a capacitor (C1), and a resistor (R1). The positive side of the d-c input voltage (11) from the vehicle battery circuit 50 is applied to the anode of the diode (D1). The diode (D1) functions as a protection diode that allows the current from the vehicle battery circuit 50 to flow in only one direction. Thus, in the event that the input voltage applied to the input circuit 12 is connected in reverse, the diode (D1) will prevent current flow, which in turn protects the input circuit 12 from damage. Note that when the d-c input voltage (11) is applied to the input circuit 12 the entire DDCC 10 is enabled.

The output from the cathode of the diode (D1) is connected to a first side of the capacitor (C1) which has its second side connected to circuit ground. Capacitor (C1) functions as a filter for the d-c voltage (11) that is applied from the vehicle battery circuit 50. Resistor (R1) which functions as a current limiter, has an input end and an output end wherein the input end is connected to a junction formed between the diode (D1) and the capacitor (C1). From the first side of the capacitor (C1) and the output end of the resistor (R1) is produced a filtered, current limited d-c power signal (13) that is applied to and enables the voltage regulating circuit 14, the comparator circuit 16 and the oscillator circuit 18, as described infra.

The voltage regulating circuit 14, as shown in FIG. 3A, is comprised of a NPN transistor (Q1) and an integrated voltage regulator (VR). The voltage regulator (VR) includes a first input (I1), a second input (I2), a third input (I3) and produces an output (O) consisting of a regulated 10 KHz square wave (15) that is applied to the base (B) of the transistor (Q1). The d-c power signal (13), is also applied to the collector (C) of transistor (Q1) and to the first input (I1) of the integrated voltage regulator (VR).

The comparator circuit 16, as also shown in FIG. 3A, is comprised of a zener diode (D2) and an integrated comparator (IC). The comparator circuit (IC) has a first input (I1) that is applied the filtered, current limited d-c power signal (13) from resistor R1, a second input (I2) that is connected to the cathode of zener diode (D2) and that consists of a clamped d-c reference voltage (25), and a third input (I3) that is applied a d-c reference voltage (27) from the output and feedback circuit 20 as described infra. The comparator circuit 16 compares the two input signals (25) and (27) and produces a d-c reference voltage (19) that is applied to the input (I2) of the voltage regulator (VR).

The oscillator circuit (18), as shown in FIG. 3A, is comprised of a first input (I1) that is applied the filtered, current limited d-c power signal (13) from resistor (R1), a second input (I2) that is connected to circuit ground via a capacitor (C2) and an output (O) that produces a chopped square wave signal (21). The frequency of the output signal (21) is determined by the value of the capacitor (C2). For example, if the value of capacitor (C2) is 470 pf, the output signal (21) is a chopped square wave signal (21) having a frequency of 100 KHz. The output signal (21) is applied to the third input (I3) of the voltage regulator (VR).

The final circuit that comprises the DDCC 10, is the output and feedback circuit 26, as also shown in FIG. 3A. The circuit 20 is comprised of a voltage blocking diode (D3) an inductor (L1), a capacitor (C3) and a voltage divider network consisting of resistors (R2) and (R3).

The anode of diode (D3) is connected to circuit ground and its cathode is connected to the emitter (E) of transistor (Q1). The inductor (L1) has an input that is connected to the junction (J1) that is formed across the diode (D3) and the emitter (E) of transistor (Q1). The output of the inductor (L1) is connected to resistor (R2) and to circuit ground via the capacitor (C3). From the intersection of the inductor (L1), the capacitor (C3) and the resistor (R2) is delivered a d-c voltage (23) having a level that operates the particular wattage of the LEDs located in vehicle LED circuit 50, as shown in FIG. 3B. The output d-c voltage (23) can range from 3 to 5 volts d-c which is suitable for illuminating a 3-watt LED.

The center tap of resistors (R2) and (R3) of the voltage divider network forms a junction (J2), wherein the non junction side of resistor (R2) is connected to the output of inductor (L1) and the non junction side of resistor (R3) is connected to circuit ground.

The ohmic value of resistors R2 and R3 is selected so that when the input voltage from the vehicle battery circuit 50 is 12-14 volts the d-c reference voltage (27) from the junction J2 is between 1.0 to 1.5 volts d-c. The level of the d-c reference voltage (27) is determined by the d-c input voltage (11) applied from the vehicle battery circuit 50 and the resistance of resistors (R2) and (R3) of the voltage-dividing network.

The d-c reference voltage (27) from the junction (J2) is applied to the third input (I3) of the comparator circuit 16 together with the clamped reference d-c voltage (25) that is applied from the cathode of zener diode (D2) to the input (I2) of the comparator (IC). The signals 25 and 27 are utilized by the comparator circuit 16 in combination with the zener diode (D2) to track changes in the output d-c voltage (23) that is applied to the vehicle LED circuit 52, as shown in FIG. 3B. The input voltage (25) that is applied to the input (I2) of the comparator (IC) is referenced to ground by the zener diode (D2). Thus, the reference d-c voltage (19) produced by the comparator (IC) reflects any changes in voltage at the LEDs that are due to varying load conditions. The signal (19) from the comparator (IC), in combination with the chopped square wave signal (21) from the oscillator circuit 18, get mixed in the regulating circuit 14 which causes the output of the voltage regulating circuit 14 to reflect any changes at the base (B) of the transistor (Q1), and allows the transistor (Q1) to function as a "high current" regulator or as a "pass transistor". Thus, the voltage applied to the LEDs is held constant and also limits the current flow under varying load conditions. The d-c reference voltage (19) from the comparator circuit 16 is applied to the input (I2) of the voltage regulating circuit 14 together with the chopped square wave signal (21) from the oscillator circuit 18. The two signals 21 and 19 are combined in the voltage regulator circuit 14 to produce the regulated 10 KHz square wave (15) that is applied to the base (B) of transistor (Q1). The application of the regulated 10 KHz square wave (15) enables the transistor (Q1) which then allows the emitter (E) of transistor (Q1) to produce a chopped square wave (29) that is clamped by the diode (D3) to circuit round. The clamped voltage is applied through the inductor (L1) which "smoothes-out" the chopped square wave (29)

and is further filtered by capacitor (C3) prior to being applied to the vehicle LED circuit 52, as shown in FIG. 3B.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A d-c to d-c converter circuit (DDCC) that operates in combination with a vehicle battery circuit (50) that produces a d-c input voltage (11), a vehicle LED circuit (52) and a vehicle electrical wiring cable (54), said DDCC comprising:
   a) an input circuit (12) having means for receiving the input d-c voltage (11) and means for producing a filtered, current limited d-c power signal (13),
   b) a voltage regulating circuit (14) comprising:
      (1) a transistor (Q1) having a collector (C) connected to the current limited d-c power signal (13), a base (B) and an emitter (E),
      (2) an integrated voltage regulator (VR) having a first input (I1) that is applied the filtered, current limited d-c power signal (13), a second input (I2), a third input (I3) and an output (O) that produces a regulated square wave signal (15),
   c) a comparator circuit (16) having means for receiving a clamped d-c reference voltage (25), a d-c reference voltage (27) and producing a d-c reference voltage (19) that is applied to the second input (I2) of the integrated voltage regulator (VR),
   d) an oscillator circuit (18) having means for receiving the filtered, current limited power signal (13) and means for producing a chopped square wave signal (21) that is applied to the third input (I3) of the integrated voltage regulator (VR) which causes the voltage regulator (VR) to apply the regulated square wave signal (15) to the base (B) of the transistor (Q1) which enables the transistor,
   e) an output and feedback circuit (26) having means for producing:
      (1) the d-c reference voltage (27) that is applied to the third input (I3) of the comparator circuit (16), and
      (2) an output d-c voltage (23) that is applied to and enables the vehicle LED circuit (52).

2. The DDCC as specified in claim 1 wherein the d-c input voltage supplied from the vehicle battery circuit (50) can range between 10 volts d-c to 28 volts d-c.

3. The DDCC as specified in claim 2 wherein said means for said input circuit 12 to receive the d-c input voltage (11) and to produce the filtered, current limited d-c power signal (13) comprises:
   a) a diode (D1) having an anode and a cathode, wherein the anode is connected to the d-c input voltage (11),
   b) a capacitor (C1) having a first side connected to the cathode of diode (D1) and a second side connected to circuit ground, and
   c) a resistor (R1) having an input end and an output end, wherein the input end is connected to a junction formed between the diode (D1) and the capacitor (C1), and from the output end of the resistor (R1) is produced the filtered, current limited d-c power signal (13).

4. The DDCC as specified in claim 2 wherein the regulated square wave signal (15) is applied at a frequency of 10 KHz.

5. The DDCC as specified in claim 2 wherein the chopped square wave signal (21) is applied at a frequency of 100 KHz.

6. The DDCC as specified in claim 2 wherein said means for said comparator circuit (16) to receive a clamped d-c reference voltage (27) and producing a d-c reference voltage (19) comprises:
   a) a zener diode (D2) having an anode and a cathode, wherein the anode is connected to circuit ground, and
   b) an integrated comparator (IC) having a first input (I1) that is applied the filtered, current limited d-c power signal (13), a second input (I2) that is applied a clamped d-c reference voltage (25) from the cathode of the zener diode (D2), a third input (I3) and an output (O) from where is produced the d-c reference voltage (19) that is applied to the second input (I2) of the voltage regulating circuit (14).

7. The DDCC as specified in claim 2 wherein said means for said oscillator circuit (18) to receive the filtered, current limited power signal (13) and producing the chopped square wave signal (21) comprises:
   a) a first input (I1) that is applied the filtered, current limited d-c power signal (23) from resistor (R1),
   b) a second input (I2) that is connected to circuit ground via a capacitor (C2), and
   c) an output (O) that produces the chopped square wave signal (21) that is dependent-upon the value of a capacitor (C2) that is connected between circuit ground and the second input (I2) of the oscillator circuit (18).

8. The DDCC as specified in claim 2 wherein the chopped square wave signal (21) is applied at a frequency of 100 KHz.

9. The DDCC as specified in claim 2 wherein said means for said output and feedback circuit (20) to producing the d-c reference voltage (27) and the output d-c voltage (29) comprises:
   a) a voltage blocking diode (D3) having an anode that is connected to circuit ground and a cathode that is applied a chopped square wave signal (29) from the emitter (E) of the transistor (Q1),
   b) an inductor (L1) having, an input end and an output end, wherein the input end is connected to a junction (J1) formed across the diode (D3) and the emitter (E) of the transistor (Q1),
   c) a voltage divider network comprised of a resistor (R2) and a resistor (R3) wherein between the two resistors (R1,R2) is formed a junction (J2) wherein the non junction end of resistor (R2) is connected to the output end of the inductor (L1) and the non-junction end of resistor (R3) is connected to circuit ground, wherein from the junction (J2) is produced a d-c reference voltage (27) that is applied to the third input (I3) on the integrated comparator (IC), and
   d) a capacitor (C3) having a first side connected to the output end of the inductor (L1) and a second side connected to circuit ground, wherein from the intersection of the inductor (L1), the resistor (R2) and the capacitor (C3) is produced an output voltage (23) that is applied to the vehicle LED circuit (52).

10. The DDCC as specified in claim 2 wherein said voltage regulating circuit and said comparator circuit (16) are combined into a single application specific integrated circuit (ASIC).

11. The DDCC as specified in claim 1 wherein the transistor (Q1) is comprised of a NPN transistor.

12. A d-c to d-c converter circuit (DDCC) that operates in combination with a vehicle battery circuit (50) that produces a positive and negative d-c input voltage (11), a vehicle LED circuit (52) and a vehicle electrical wiring cable (54) said DDCC comprising:
   a) an input circuit (12) having:

(1) a diode (D1) having an anode and a cathode wherein the anode is connected to the positive d-c input voltage (11), (2) a capacitor (C1) having a first side connected to the cathode of diode (D1) and a second side connected to circuit ground, (3) a resistor (R1) having an input end and an output end, wherein the input end is connected to a junction formed between the diode (D1) and the capacitor (C1), and from the output end of said resistor (R1) is produced a filtered, current limited d-c power signal (13), b) a voltage regulating circuit (14) having:

(1) a transistor (Q1) having a collector (C), a base (B) and an emitter (E), wherein the collector (C) is connected to the filtered, current limited d-c power signal (13), (2) an integrated voltage regulator (VR) having a first input (I1) that is connected to the filtered; current limited d-c power signal, a second input (I2), a third input (I3) and an output (O) consisting of a regulated square wave signal (15) that is applied to the base (B) of the transistor (Q1), c) a comparator circuit having:

(1) a zener diode (D2) having an anode and a cathode, wherein the anode is connected to circuit ground, (2) an integrated comparator (IC) having a first input (I1) that is applied the filtered, current limited d-c power signal (13), a second input (I2) that is applied a clamped d-c reference voltage (25) from the cathode of the zener diode (D2), a third input (I3) and an output (O) from where is produced a d-c reference voltage (19) that is applied to the second input (I2) of the voltage regulating circuit (14), d) an oscillator circuit (18) having:

(1) a first input (I1) that is applied the filtered, current limited d-c power signal (23) from resistor (R1), (2) a second input (I2) that is connected to circuit ground via a capacitor (C2), (3) an output (O) that produces a chopped square wave signal (21) that is applied to the third input (I3) in the voltage regulator (VR), e) an output and feedback circuit (26) having:

(1) a voltage blocking diode (D3) having an anode that is connected to circuit ground and a cathode that is applied a chopped square wave signal (29) from the emitter (E) of the transistor (Q1), (2) an inductor (L1) having an input end and an output end, wherein the input end is connected to a junction (J1) formed across the diode (D3) and the emitter (E) of the transistor (Q1), (3) a voltage divider network comprised of a resistor (R2) and a resistor (R3) wherein between the two resistors (R1,R2) is formed a junction (J2) wherein the non-junction end of resistor (R2) is connected to the output end of the inductor (L1) and the non-junction end of resistor (R3) is connected to circuit ground, wherein from the junction (J2) is produced a d-c reference voltage (27) that is applied to the third input (I3) on the integrated comparator (IC), (4) a capacitor (C3) having a first side connected to the output end of the inductor (L1) and a second side connected to circuit ground, wherein from the intersection of the inductor (L1), the resistor (R2) and the capacitor (C3) is produced an output voltage (23) that is applied to and enables the vehicle LED circuit (52).

13. The DDCC as specified in claim 12 wherein the d-c input voltage from the vehicle battery circuit (50) can range from 10 volts d-c to 28 volts d-c.

14. The DDCC as specified in claim 12 wherein said transistor (Q1) is comprised of a NPN transistor.

15. The DDCC as specified in claim 12 wherein the regulated square wave signal (15) is applied at a frequency of 10 KHz.

16. The DDCC as specified in claim 12 wherein the chopped square wave signal (21) is applied at a frequency of 100 KGz.

17. The DDCC as specified in claim 12 wherein said DDCC is attached to the vehicle electrical cable by means of a connector (P1) that is spliced into the cable and that is configured to accept a set of four pins projecting from said DDCC.

18. The DDCC as specified in claim 12 wherein said DDCC is hard-wired directly to the wiring of the vehicle electrical cable.

* * * * *